C. V. FITZPATRICK.
DIRIGIBLE HEADLIGHT.
APPLICATION FILED AUG. 6, 1915.
1,198,903.
Patented Sept. 19, 1916.
2 SHEETS—SHEET 1.
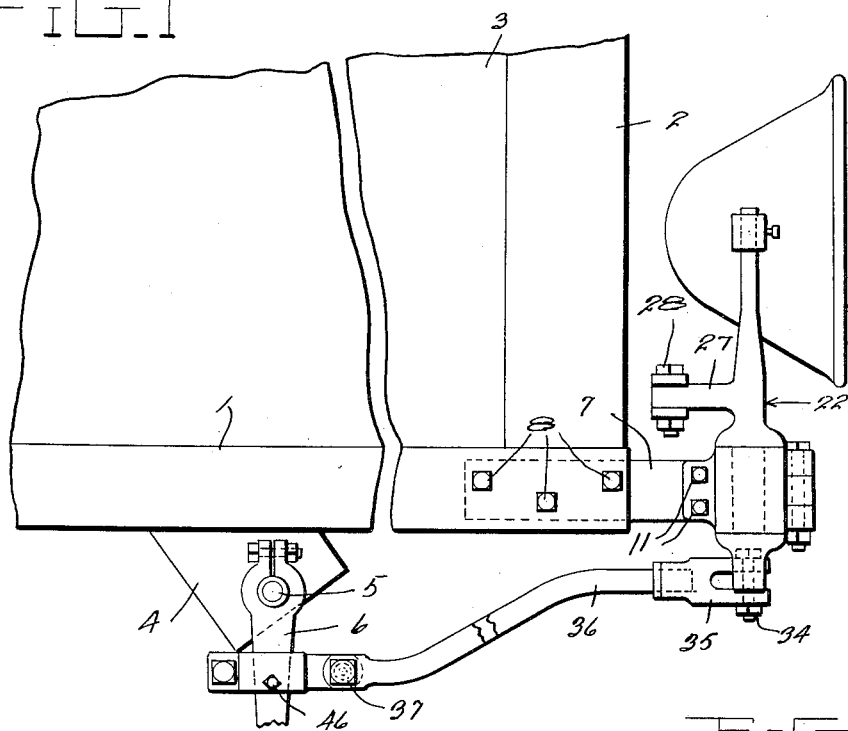
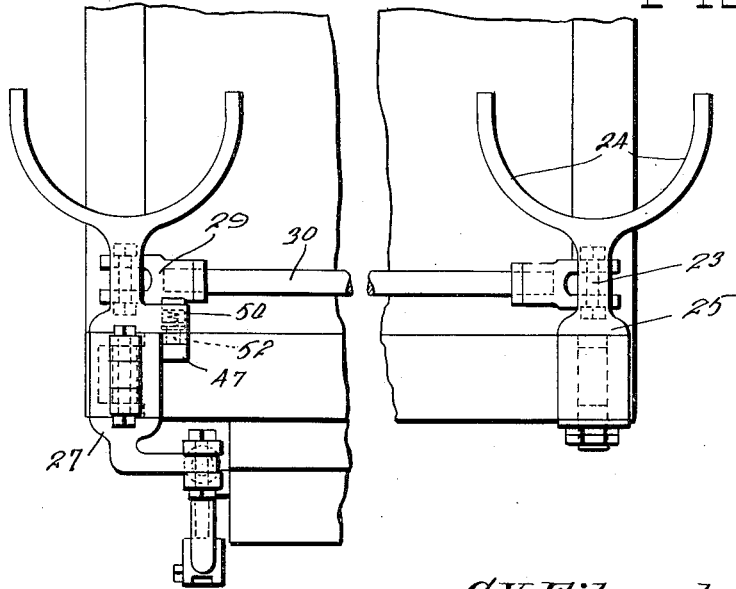
Witnesses
Inventor
C. V. Fitzpatrick,
By
Attorney

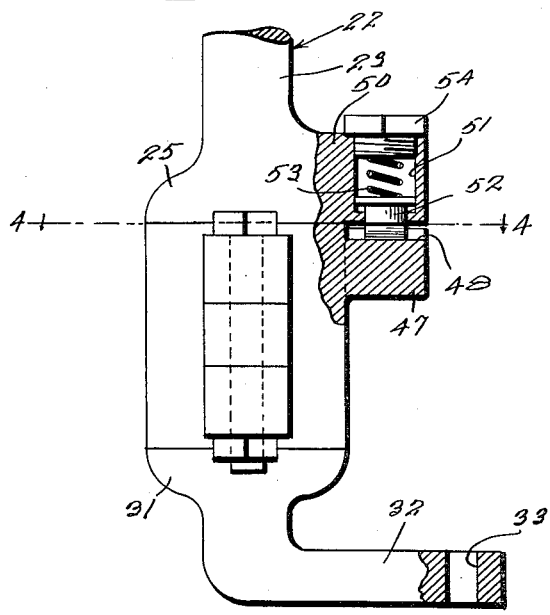
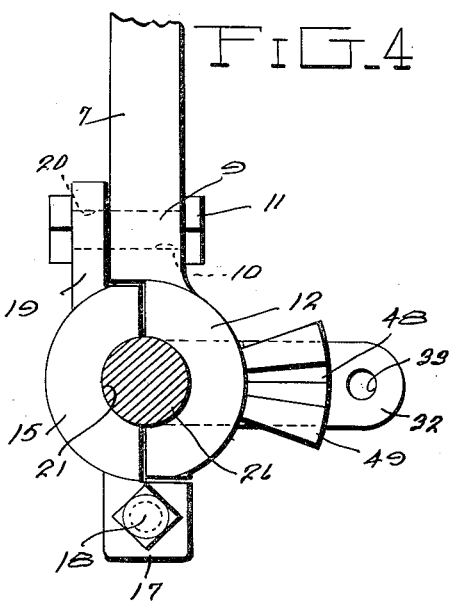
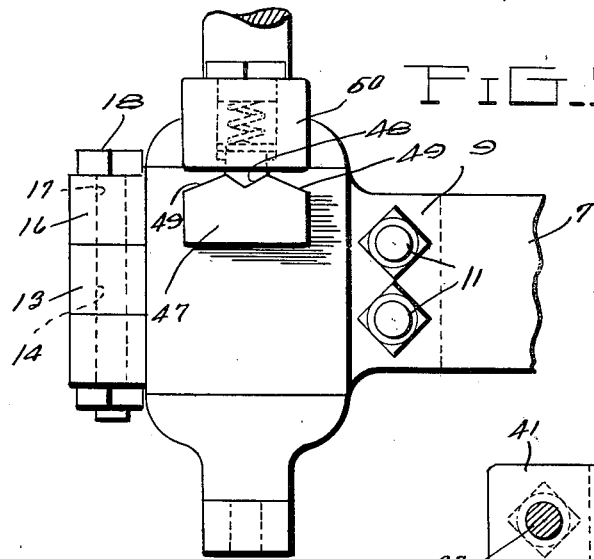
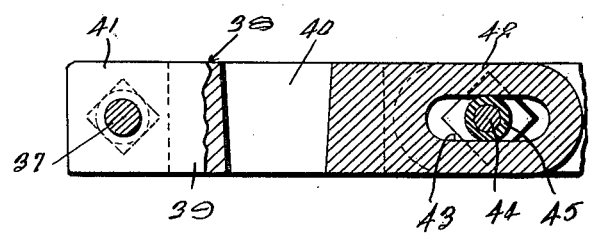

UNITED STATES PATENT OFFICE.

CHARLES V. FITZPATRICK, OF KANSAS CITY, MISSOURI.

DIRIGIBLE HEADLIGHT.

1,198,903.  Specification of Letters Patent.  Patented Sept. 19, 1916.

Application filed August 6, 1915. Serial No. 44,037.

*To all whom it may concern:*

Be it known that I, CHARLES V. FITZPATRICK, a citizen of the United States, residing at Kansas City, in the county of Jackson and State of Missouri, have invented certain new and useful Improvements in Dirigible Headlights; and I do hereby declare the following to be a full, clear, and exact description of the invention, such as will enable others skilled in the art to which it appertains to make and use the same.

This invention relates to new and useful improvements in dirigible headlights and the principal object of the invention is to provide a means for turning the headlights of motor vehicles so that the roadway will be illuminated when rounding curves and the like.

Another object of the invention is to provide a latch for holding the lights in their normal forwardly directed positions so that the shaking and movements of the same will be avoided due to the roughness of the roadway over which the vehicle is traveling.

With these and other objects in view, the invention consists in the novel combination and arrangement of parts which will be fully set forth in the following specification and accompanying drawings, in which:—

Figure 1 is a fragmentary side view of the forward end of a motor vehicle showing my improved headlight and mounting therefor, applied. Fig. 2 is a fragmentary front view in elevation of the radiator showing the lamp brackets and the mountings therefor. Fig. 3 is an enlarged front elevation of one of the brackets showing a portion thereof in section to more clearly illustrate the details of construction. Fig. 4 is a sectional view on line 4—4 of Fig. 3. Fig. 5 is a view similar to Fig. 3, taken from the opposite side of the device, and Fig. 6 is a detail view of the connecting bracket showing the same partly in section and partly in elevation.

Referring now to the drawings by characters of reference, the numeral 1 designates the chassis of an ordinary vehicle of the motor type, provided with the usual radiators 2 and hood 3. This chassis carries the ordinary plate 4 in which the steering shaft 5 is mounted and this steering shaft carries the ordinary type of steering arm 6 as clearly illustrated in Fig. 1. Mounted at the forward end of the chassis are the extensions 7, which are secured thereto by means of suitable bolts 8 and these extensions 7 are the supports for the lamp brackets, which will be more fully hereinafter described.

The lamp brackets in which the standards on which the lamps are mounted, are secured, are best illustrated in Figs. 3 to 5 inclusive and each comprises a forward extension 9 formed at the extreme forward end of the extension 7 hereinbefore referred to. This forward extension 9 is formed with a pair of spaced apertures 10 for the reception of the clamping bolts 11 as clearly shown in the drawings. The extreme forward end of the extension 9 is provided with an arcuate clamping member 12, which is provided at its extreme forward end with a suitable hinge barrel 13 having the axial bore 14 formed therein.

Coöperating with the arcuate extension 12 is the arcuate clamping member 15, provided at its extreme forward end with a pair of hinge barrels 16, which are provided with the axial bores 17, which aline with the bore 14 and receive the hinge pin or bolt 18 as clearly shown in the drawings. The rear end of the arcuate clamping member 15 is provided with a suitable plate or extension 19 having formed therein, a pair of spaced apertures, which are adapted to receive the clamping bolts 11, as shown in Fig. 4. The adjacent faces of the arcuate members 12 and 15 are formed with the curved bearing surfaces 21 in which the lower end of the lamp standard is rotatably mounted.

The lamp standard hereinbefore referred to is designated generally by the numeral 22 and comprises the stem or shank 3 provided at its upper end with the fork members 24. The lower end of the stem or shank is provided with an enlargement 25, the under face of which bears on the upper faces of the arcuate members 12 and 15 hereinbefore referred to. A suitable cylindrical extension 26 projects downwardly from the under face of the enlargement 25, which is journaled in the arcuate members 12 and 15. Extending rearwardly from each of the shanks or stems 23 hereinbefore referred to is an arm 27, the rear end of which is provided with a vertical aperture for the reception of the connecting bolt 28 by means of which the bifurcated connection is secured to the bracket.

In order to swing the lamp one of the extensions 26 is formed at its lower end with a suitable enlargement 31, provided with the arm 32, having formed therein an opening 33 through which a bolt 34 extends. This bolt 34 forms the connection by means of which the bifurcated connecting member 35 of the operating rod 36 is secured to the arm 32. The operating rod 36 is bent downwardly and rearwardly as illustrated in Fig. 1 and is pivotally connected by means of the bolt 37 to the forward end of the bracket by which the device is connected to the steering arm 6 of the vehicle.

The bracket hereinbefore referred to is designated generally by the numeral 38 and comprises the body 39 provided with the tapered openings 40, through which the steering arm 6 extends. This body is formed at each end with the extensions 41 and 42 and the extension 42 is provided with a slot 43 for the reception of the stem 44 of the bolts 37 around which the roller 45 fits. This roller 45 forms a bearing which engages the walls of the slot 43 and forms the connection between the rear end of the rod 36 and the connecting member 38. A suitable set screw 46 extends through a threaded opening formed in the body 38 and the inner end of the set screw projects into the opening 40 so as to engage the arm 6 and hold the connection 38 in proper position thereon.

The arcuate extension on one of the lamp supports is provided with an angular projection 47 having its upper face provided with a central depression 48 and with the inclined faces 49. This central depression acts as a keeper for the latch member carried on an extension 50 formed on one of the stems 23, which latch member is provided with an opening 51 in which the latch 52 is slidably mounted. This latch 52 is forced downwardly by means of the spring 53, the tension of which is adjusted by the threaded plug 54 so that the pressure exerted on the latch may be regulated.

It will be apparent from the foregoing that in use the movement of the steering wheel will cause the arm 6 to move forwardly or rearwardly and thereby move the rod 36 in the same direction, thereby transmitting movement to the arm 32 which will cause the enlargement 31 on which it is formed to rotate and thereby revolve the cylindrical body 26, thus causing the standard 22 to rotate so that the lamp mounted between the forks thereon will swing into the direction of travel of the vehicle. Simultaneously with the movement of the bracket 22, the opposite bracket will also be moved through the medium of the connecting rod 30 and thus both of the headlights will be turned. The lights will be held against accidental movement by the latch 52 engaging in the notch 48 and it will thus be seen that jolts will have no effect thereon.

While in the foregoing there has been shown and described the preferred embodiment of this invention, it is to be understood that such changes may be made in the combination and arrangement of parts as will fall within the spirit and scope of the appended claim.

What is claimed is:—

A device of the character set forth comprising a clamping member, means for securing the clamping member to an automobile, a lamp stem journaled in said clamping member, a headlight secured to the stem, an arcuate extension formed on the clamping member and having a central depression and a pair of inclined faces thereon, an extension formed on said stem and disposed in the same plane with the first mentioned extension, the second mentioned extension having a bore terminating in a restricted opening, a latch slidable in said opening and bore for an engagement with the inclined faces and depression of the first mentioned extension to properly aline the headlight when returned to its normal position, a spring within the bore and bearing upon the catch, and a cap adjustably secured within the bore to regulate the tension of the spring upon said catch.

In testimony whereof I affix my signature in presence of two witnesses.

CHARLES V. FITZPATRICK.

Witnesses:
  LEON TAYLOR,
  FRED CAMENT.